United States Patent [19]

Bradford, Jr.

[11] Patent Number: 4,621,513
[45] Date of Patent: Nov. 11, 1986

[54] METHOD FOR MAKING A ROLLED LIP CONTAINER

[75] Inventor: John F. Bradford, Jr., Katy, Tex.

[73] Assignee: Shell Oil Company, Houston, Tex.

[21] Appl. No.: 792,090

[22] Filed: Oct. 28, 1985

[51] Int. Cl.⁴ .............................................. B21D 28/00
[52] U.S. Cl. ......................................... 72/334; 72/352
[58] Field of Search ................. 72/327, 333, 334, 352, 72/350

[56] References Cited

U.S. PATENT DOCUMENTS

| | | | |
|---|---|---|---|
| 4,062,311 | 12/1977 | Zugcic | 72/334 |
| 4,309,888 | 1/1982 | Miller | 72/334 |
| 4,489,584 | 12/1984 | Gall | 72/334 |

Primary Examiner—Leon Gilden
Attorney, Agent, or Firm—Jennifer R. Ross

[57] ABSTRACT

A process for making a rigid packaging container which contains a "rolled lip" which comprises deforming a sheet of metal, plastic or paper composite material over a mold into a desired formed shape which contains a "lip", advancing a trimming means from the convex or bottom side of the shape while said shape is supported so that said shape does not deform; and trimming the shape from the convex or bottom side of the shape at a point on the lip of the shape which undercuts the periphery of the shape while, at the same time, forcing open the undercut of the lip of the shape.

6 Claims, 6 Drawing Figures

METHOD FOR MAKING A ROLLED LIP CONTAINER

FIELD OF THE INVENTION

This invention relates to rigid packaging containers, more particularly, rigid packaging containers which have a "rolled lip".

BACKGROUND OF THE INVENTION

There are many ways to form rigid packaging containers. These may be formed by conversion of a plastic sheet for example, or a metal or paper composite via solid phase pressure-forming and solid phase stretch forming melt thermal processes and the like. Oftentimes, it is necessary or desirable to manufacture containers which have a "rolled lip" or flange which extends from the top of the side wall of the container for various purposes. An example of such a rolled lip is found on a "stadium" cup which is used to drink various beverages. The "rolled lip" may be useful for packaging of various dairy products, frozen foods, meat, fish, poultry and the like. Some type of an outer lip or flange which is rolled under is advantageous for various reasons. One of the reasons for this is that the rolled under-lip protects the drinker of the beverage from cuts due to the sharp edge of the lip which is not rolled under. In addition, the rolled lip facilitates packaging and wrapping of the various containers for holding foods and beverages. For example, it may be desirable to wrap the container with a see through plastic film for packaging and storage on the shelf of supermarkets. Conventional lips which are not rolled under result in oftentime sharp and jagged edges which may puncture the film which is used to wrap over the top of the article and which is usually wrapped underneath the lip edge.

In producing a "rolled lip" container, it has been necessary that the production of the rolled lip be in a separate, secondary lip rolling step. Heretofore, a plastic article was made with a lip which was generally perpendicular to the side wall of the vessel or container and then in a second step the lip rolled under to create the appropriate rolled angle to facilitate downstream use. This second step of forming the lip into a rolled configuration has been time consuming and unwielding, not to mention expensive.

In past attempts to produce a molded article which has a "rolled lip" without the necessity of a separate rolling step, the part had to be shaped with the rolled lip and at the time the excess material was to be trimmed from the part. The trimming of the part at about the lip portion of the shaped part resulted in a flattening of the lip during the trimming process. This is because the trimming process has occurred with the top or concave part of the shape remaining in an upright position so that when the cutter edge press down upon the edge of the "rolled lip", the lip, as it was cut, flattens substantially to make a separate lip rolling step necessary.

SUMMARY OF THE INVENTION

Applicants have designed a novel method by which such a rolled lip container can be fabricated in one fabricating and cutting process without a secondary lip rolling step. This process for making a rigid packaging container which contains a "rolled lip" which does not need a secondary lip rolling step, comprises the steps of deforming a sheet of metal, plastic or paper composite material over a mold into a desired formed shape which contains a lip, where the formed shape and the mold are in a position during deformation, so that the shape is supported from the top side or concave side of the shape and the shape remains in contact with the mold, advancing a trimming means from the convex or bottom side of the shape, trimming the shape from the convex or bottom side of the shape at a point on the lip of the shape which undercuts the periphery of the shape while, at the same time, forcing open the undercut of the lip of the formed shape.

DETAILED DESCRIPTION OF THE INVENTION

Figure 1:
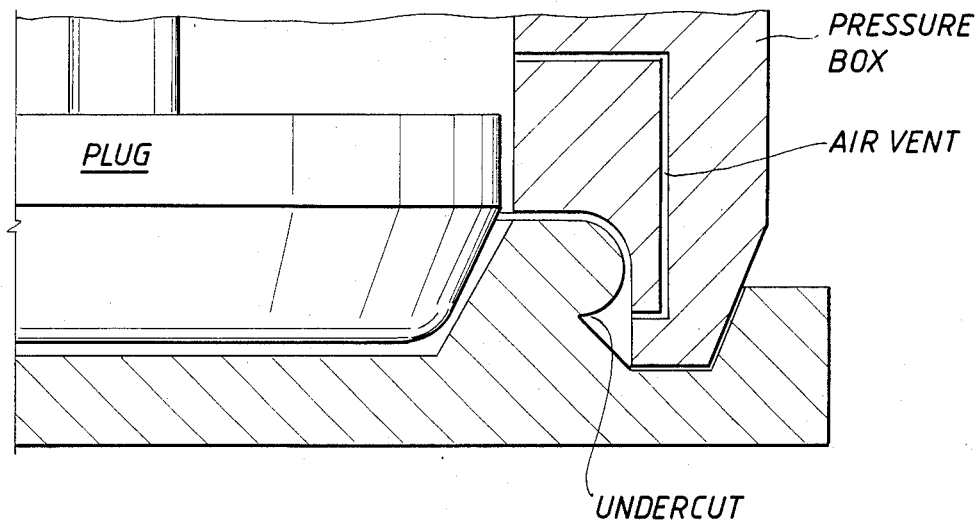
FIG. 1 a drawing of the "rolled lip" rigid packaging container-making apparatus.

FIG. 1 illustrates a female mold which is constructed with outward projecting edges, i.e. flanges, rim or lips of the mold cavity which are semi-circular in cross section with a deep undercut intersecting the base of the semi-circle. A flange-forming air vent is used to produce this flange or lip. A pressure box facilitates this production.

Figure 2:
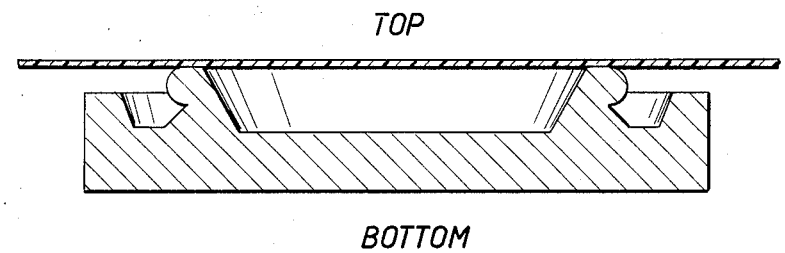
FIG. 2 illustrates the step of the placement of a flat sheet material over the mold.

In FIG. 2 a flat sheet of metal, plastic or paper composite is placed over the mold. For the purposes of this invention the part of the sheet which is facing upward is deemed to be the "top" of the sheet and the part of the sheet which is facing downward and at this point adjacent to the mold is the "bottom" of the sheet. The sheet is deformed over the mold under the influence of a differential pressure between the volumes separated by the sheet. Heat, vacuum, mechanical or pneumatic assist may be used to implement the deformation process.

Figure 3:
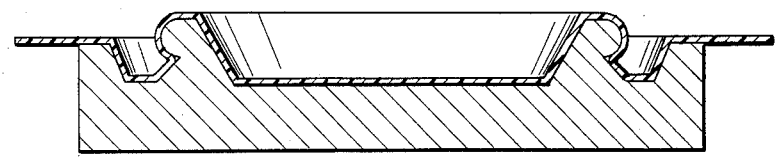
FIG. 3 illustrates the deformation of the sheet conformed to the mold.

In FIG. 3, the sheet is shown actually deformed to conform to the mold. The "rolled lip" is now a part of the sheet.

Figure 4:
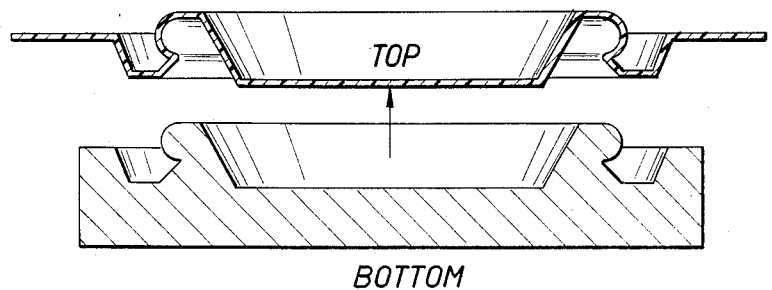
FIG. 4 illustrates the removal of the sheet from the mold and transfer to the trim station.

In FIG. 4, the "rolled lip" sheet may be removed from the mold and is now a formed shape. The formed shape may be left adjacent and attached to the mold, or may be removed and transferred to a suitable type of support for cutting.

Figure 5:
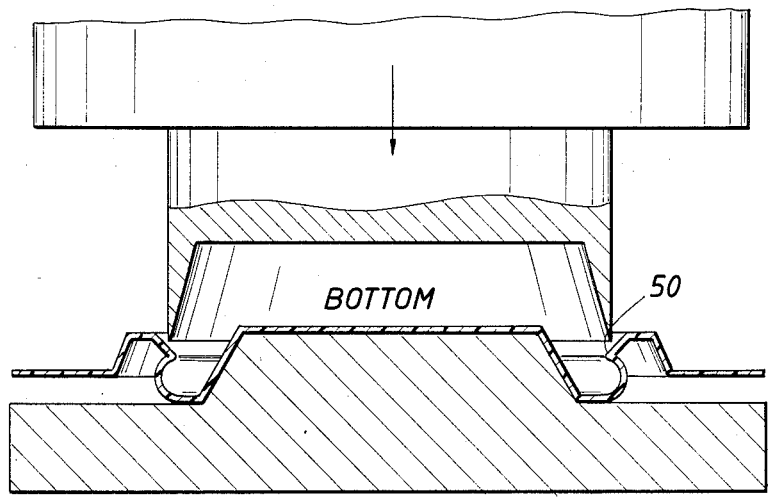
FIG. 5 illustrates the position of the formed shape during trimming.
Figure 6:
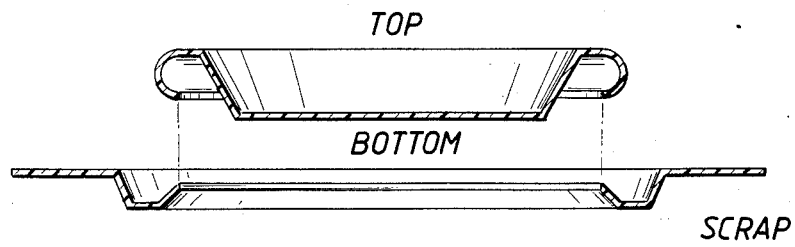
FIG. 6 illustrates the finished "rolled lip" container.

FIG. 5 shows the formed shape and the trimming of the shape. A trimming means is advanced from the concave or bottom side of the formed shape. The trimming means may be an angled or tapered blade or any other suitable means. The trimming means is used to trim the shape from the convex or bottom side of the shape starting at a point on the lip of the shape which undercuts the periphery of the shape while at the same time, forcing open the undercut of the length of the shape. Thus, the trimming means is begun at point 50 of FIG. 5. The trimming acts in a sense as a shaving of the lip of the formed shape up against the mold or support. In this way, there is sufficient support beneath the "rolled lip" portion of the shape which presents disadvantageous flattening and deformation of the rolled lip. After the lip is cut sufficiently, the formed shaped is removed from the mold or support and used downstream.

Articles which incorporate this design may be overwrapped with metal, paper, plastic or composite film without puncturing the film; for example, shrink wrapped produce trays. Other modifications of this method will be apparent to others of ordinary skill in the art.

What is claimed:

1. A process for making a rigid packaging container which contains a "rolled lip" which comprises the steps of:
   deforming a sheet of metal, plastic or paper composite material over a mold into a desired formed shape which contains a lip;
   advancing a trimming means from the convex or bottom side of said shape while said shape is supported so that said shape does not deform; and
   trimming said shape from said convex or said bottom side of said shape at a point on said lip of said shape which undercuts the periphery of said shape while, at the same time, forcing open the undercut of said lip of said shape.

2. The process in claim 1 wherein the deformation of the sheet of metal, plastic or paper composite material over a mold into a desired formed shape which contains a lip is accomplished by solid phase pressure-forming or melt thermo-forming processes.

3. The process of claim 1 wherein material which is deformed over a mold into a desired formed shape which contains a lip is a plastic material.

4. The process of claim 1 wherein said formed shape is overwrapped with metal, paper, plastic or composite film.

5. A process for making a rigid packaging container which contains a "rolled lip" which comprises the steps of:
   deforming a sheet of plastic over a mold into a desired formed shape which contains a lip;
   advancing a trimming means from the convex or bottom side of said shape; and while said shape is supported so that said shape does not deform; and
   trimming said shape from said convex or bottom side of said shape at a point on said lip of said shapes which undercuts the periphery of said shape while, at the same time, forcing open the undercut of said lip of said shape.

6. The process of claim 5 wherein said formed shape may be overwrapped with metal, paper, plastic or composite film.

* * * * *